United States Patent
Thayer et al.

[11] Patent Number: 5,131,183
[45] Date of Patent: Jul. 21, 1992

[54] BAIT KEEPER

[76] Inventors: Timothy Thayer, 13411 Oakledge, Houston, Tex. 77065; Guy L. McClung, III, 8130 Vintage Creek, Spring, Tex. 77379

[21] Appl. No.: 606,545

[22] Filed: Oct. 31, 1990

[51] Int. Cl.⁵ .................................................. A01K 91/00
[52] U.S. Cl. ..................................... 43/43.11; 43/44.99
[58] Field of Search ................. 43/43.1, 43.11, 43.15, 43/42.74, 44.99

[56] References Cited

U.S. PATENT DOCUMENTS

| | | | |
|---|---|---|---|
| 1,764,738 | 6/1930 | Marsters | 43/43.15 |
| 3,163,957 | 1/1965 | Barrett | 43/43.11 |
| 3,753,309 | 8/1973 | Bryant | 43/43.11 |
| 3,769,740 | 11/1973 | Lang | 43/44.99 |
| 4,017,999 | 4/1977 | Muko | 43/44.99 |
| 4,065,870 | 1/1978 | Muko | 43/44.99 |
| 4,961,280 | 10/1990 | Hudson | 43/44.99 |

Primary Examiner—Kurt Rowan
Assistant Examiner—Chuck Y. Mah

[57] ABSTRACT

A fish bait keeper for shielding bait from undersirable fish and permitting un-shielding of the bait at a desired water depth where it is anticipated desirable fish are located, the bait keeper having, in one aspect, a hollow bait shield for containing and shielding the bait and related items such as line, leaders, connectors, etc. and a device for allowing the bait to be separated from the shield when desired or, in one aspect, the shield itself having parts releasable from each other to expose the bait or to allow it to descend from the device.

13 Claims, 2 Drawing Sheets

BAIT KEEPER

BACKGROUND OF THE INVENTION

1. Field Of The Invention

The present invention is directed to bait keepers for shielding fish baits and for exposing them at a desired depth.

2. Description Of Related Art

Often when fishing for a certain species of desirable fish (e.g. red snapper) a baited hook must be lowered to a depth at which it is anticipated the fish are located. It is not uncommon for the bait to be attacked or removed by an undesirable fish (e.g. a triggerfish) before the baited hook reaches the desired depth.

There has long been a need for something which shields a bait from undesirable fish. There has long been a need for such a device in which the bait can be exposed when desired. There has long been a need for such a device which can be used with a plurality of baits or baited hooks.

SUMMARY OF THE PRESENT INVENTION

In one embodiment, the present invention teaches a bait keeper that includes a two piece container with a top part and a bottom part which are releasably held together, e.g. with tape, a press fit or a snap fit, with a main line or leader extending through the top part of the container, one or more hook lines with hooks attached to the main line, the hook lines disposable with their hooks in the container when the two container parts are fit together, the two parts fit together so that a sharp jerk on a line connected to the container causes the two parts to separate thereby freeing and exposing the baits, baited hook or hooks within the container. The container may have a hole in it through which a connecting line passes, the hook secured to the connecting line within the container with a stop member such as a clamp-on lead weight clamped to the connecting line within the container. The container parts themselves can be of such a weight that the sharp jerk causes separation of the container parts or additional weight can be disposed within or beneath the bottom part of the container. Either or both of the container parts may have holes so that water fills the container so that it does not act as a buoyant float impeding the descent of the device. The container may be any desired shape, e.g., but not limited to ovoid (egg-shaped), spheroid, cube, pyramid. In various embodiments, the two container parts are: on leaders connected to a main leader; or both on one leader; on interconnected lines.

In another embodiment, a bait shield is provided with a hole therein through which a line may freely pass. The line is releasably secured to the shield so that upon its release a bait previously disposed within the shield and tied to the line is then free to move beyond the shield. In one aspect, a movable door or barrier is provided across an opening in the shield, the opening through which the bait and line pass upon release of the line from the releasable line securement.

It is, therefore, an object of the present invention to provide a new, useful, unique, effective and non obvious bait keeper which will expose a baited hook when desired.

Another object of the present invention is the provision of such a bait keeper which can contain more than one bait.

Yet another object of the present invention is the provision of such a device in which two container pieces can be popped open from a remote location to expose a bait.

A further object of the present invention is the provision of such devices in which the container is weighted to facilitate popping it open from above.

An additional object of the present invention is the provision of a bait keeper with a shield for containing and shielding the bait until it is located near desirable fish, the shield being solid, perforated, or made from mesh or screen.

Another object of this invention is the provision of a bait keeper with a shield and apparatus for releasably holding a portion of line so that upon release of the line the bait is no longer shielded.

Yet another object of this invention is the provision of such shields with a door hingedly connected thereto for releasably closing off an open portion of the shield.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DESCRIPTION OF EMBODIMENTS PREFERRED AT THE TIME OF FILING FOR THIS PATENT

Figure 1:
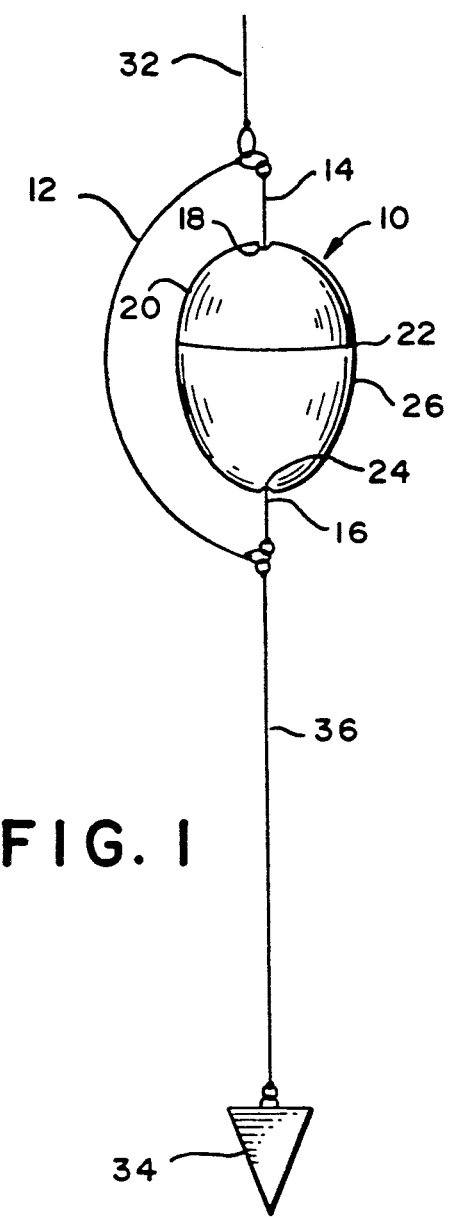
FIG. 1 is a side view of a bait keeper according to the present invention.
Figure 2:
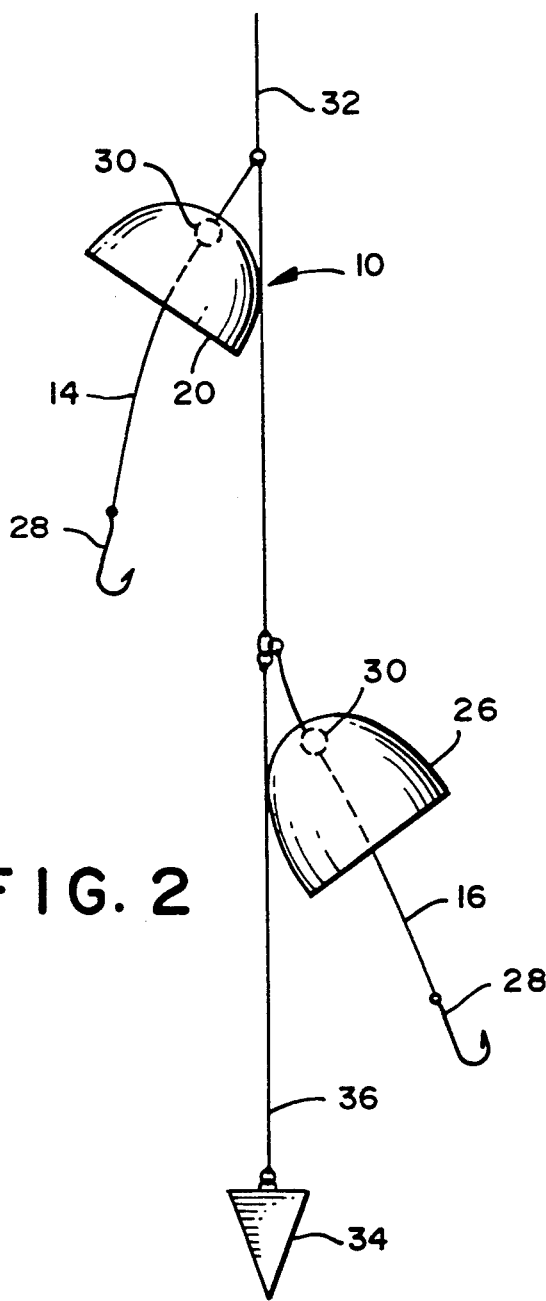
FIG. 2 is a side view of the bait keeper of FIG. 9.

Referring now to FIGS. 1 and 2, a bait keeper device 10 according to the present invention has a main line or leader 12 to which is connected a top hook line 14 and a bottom hook line 16. The top hook line 14 extends through a hole 18 in a top part 20 of an eggshaped (ovoid) container 22 and the bottom hook line 16 extends through a hole 24 in a bottom part 26 of the container 22. Hooks 28 are connected to each of the hook lines and clamp-on lead pieces 30 serve as stop members to limit the movement of the hook lines through their respective holes. A weight 34 is attached to a bottom line 36 which is secured to the main line 12.

As shown in FIG. 1, the two parts of the container 22 are snap fit together and the hooks and hook lines are enclosed within the container. FIG. 2 illustrates the position of the various items after a line to the surface 32 has been jerked to pop apart the top part 20 and the bottom part 26 of the container 22. The container 22 is sized to accommodate a portion of each hook line 14, 16; the hooks 28; and bait (not shown) placed on the hooks.

Figure 3:
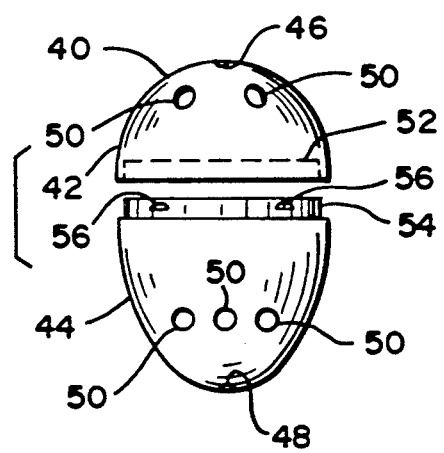
FIG. 3 is a side exploded view of a bait keeper according to the present invention.

Referring now to FIG. 3, a container 40 according to the present invention has a top part 42 and a bottom part 44. Holes 46 and 48 permit the passage of lines through the parts and holes 50 insure that the container 40 will fill with water when it contacts water so that it will not float and act like a bobber or fishing float. It is within the scope of this invention to have a container that does not fill with water and does provide some buoyancy; e.g., the tolerance between line holes in top and bottom parts of a container and hook lines themselves can be such that little or no air escapes from a container when it is submerged; or stop members for the lines can be such that they close off the holes. A buoyant container will hold the hooks and baits off the bottom until the container is opened. A container with holes in it to permit the container to fill with water will descend more easily than a buoyant container. The top part 42 has a slight interior recess 52 into which is press fit a lip 54 of the bottom part 44 to hold the two parts together until a line (not shown) connected to the top part is jerked. Small ridged portions 56 around the lip 54 provide a tight fit in the recess 52.

Figure 4:
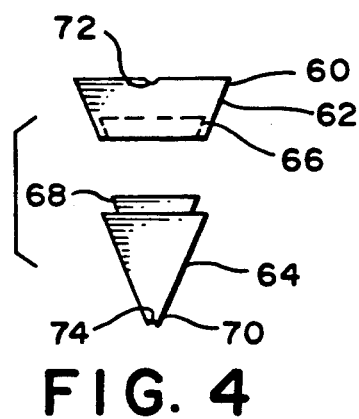
FIG. 4 is a side exploded view of a bait keeper according to the present invention.

FIG. 4 illustrates an alternative embodiment for a container (like the containers 22 and 40). A hollow container 60 has a top part 62 and a bottom part 64 which are held together in a press fit by a recess 66 in the top part 62 and a lip 68 on the bottom part 64. The container 60 is a hollow pyramid and is shown with its apex 70 inverted. Disposed in this manner, it will move more easily through the water. Holes 72 and 74 are provided through which lines may pass.

Figure 5:
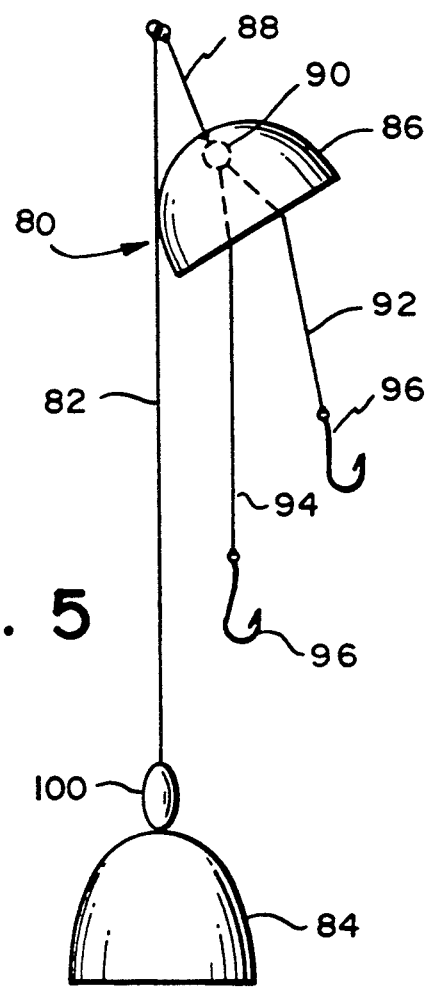
FIG. 5 is a side view of a bait keeper according to the present invention.

Referring now to FIG. 5, a device 80 according to the present invention has a main line 82 with one end connected to a bottom part 84 of a container (like the containers 22 and 40). A top part 86 of the container has a secondary line (or leader) 88 connected thereto which is also connected to the main line 82. A ring 90 disposed within the top part 86 serves as a stop member for the line 88 which passes through a hole (not shown) in the top portion 86. Two hook lines 92 and 94 are tied to the ring 90 and have hooks 96 tied thereto. The container contains both hook lines and hooks (and baits on the hooks, if any) until a line 98 to the surface is jerked, releasing the two parts of the container. Of course, lures may be used instead of hooks or hooks and baits. A weight 100 connected to the bottom part 84 helps to maintain the bottom part 84 below the top part 86 until the two parts separate.

Figure 6:
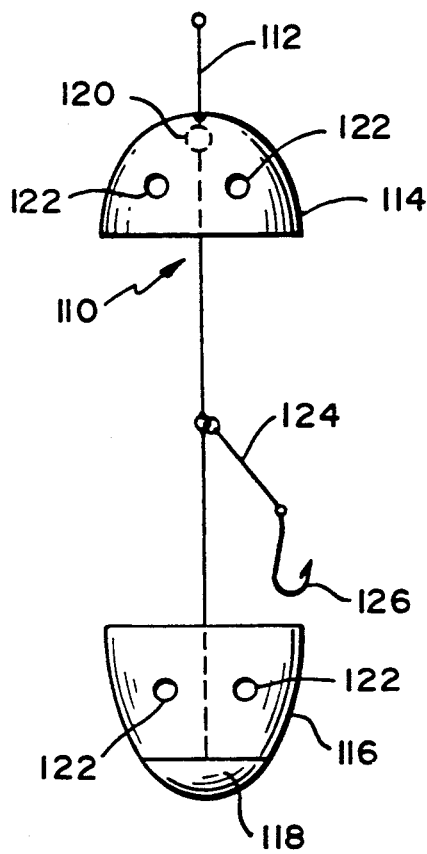
FIG. 6 is a side view of a bait keeper according to the present invention.

Referring now to FIG. 6, a device 110 according to this invention has a main line 112 which extends through a top part 114 of a container and to a bottom part 116 of the container to which it is secured. A weight 118 is disposed in the bottom part 116. Holes 122 permit the container to fill with water when it is submerged. A stop member 120 secured to the line 112 insures that the top part 114 will not move further downward on the main line 112. A hook line 124 with a hook 126 is tied to the main line 112 and the hook line and hook are enclosed within the container with bait, if any, when the two parts are snap fit together.

Figure 7:
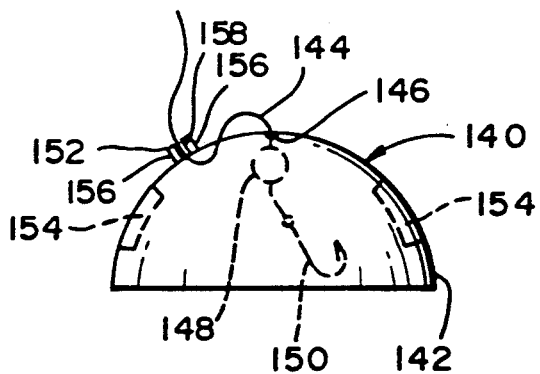
FIG. 7 is a side view of a bait keeper according to the present invention.

FIG. 7 illustrates a device 140 according to the present invention that has a half-spheroidal shield 142 with a hole 146 in its top through which passes a line 144 having a weight 148 secured thereto and a hook 150 tied at its end. While the hook 150 (and any additional bait attached to it) is within the shield 142 the shield prevents undesirable fish from seeing the bait (except from below) and inhibits the fishes' access to the bait. The line 144 is held in a releasable line holder 152 which has dual opposed holder members 156 with a line recess 158 therebetween from which a line may be released by a sudden jerk from above. Upon such release, the line 144 moves freely through the hole 146 and the hook 150 moves below the shield 142, thereby exposing the hook 150. Movement of the shield away from the hook 150 may be facilitated by adding buoyant material 154 to the shield 142. As shown this buoyant material is disposed on the shield's interior, but it may be positioned anywhere on the shield. Any releasable line holder (e.g. tape, pieces of Velcro (TM) material, etc.) may be used to releasably hold the line to the shield 142.

Figure 8:
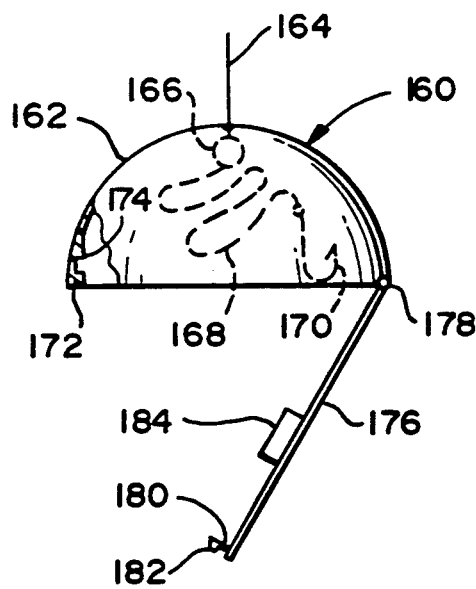
FIG. 8 is a side view of a bait keeper according to the present invention.

Referring now to FIG. 8, a device 160 according to this invention has a half-spheroidal hollow shield 162 to which is hingedly connected a door 176 by means of a hinge 178. The door 176 may be solid, perforated, or made from a mesh or screen to prevent access to the shield's contents by unwanted fish or other creatures (e.g. crabs). Of course, the shield 162 (as the shield 142, FIG. 7) may be of any desirable shape for containing a fish bait ("fish bait" including, but not limited to one or more lures, live baits, dead baits, hooks or any combination of them). The door 176 is releasably held to close off the bottom of the shield 162. This may be accomplished by a lip-recess combination, a piece of tape, pieces of Velcro (TM) material or other suitable means including a lip 180 with a bead 182 that is snappable into a recess 174 in a ridge 172 on the shield 162. Upon release of the bead 182 from the recess 174, the contents of the shield 162 is allowed to descend from the shield 162, i.e., in the embodiment shown a portion of line or leader 168 and a hook 170 tied thereto falls from the shield 162 and is exposed to fish. The line 168 is tied to a connector (e.g. a typical ring or swivel) which also serves as a stop member preventing the line portion 168 from going through a hole (not shown). To facilitate downward movement of the door 176, a weight 184 may be connected to it.

The tape, Velcro (TM) material, bead-recess, or lip-recess means for rendering members releasably securable described in the various embodiments above may be interchanged and used with each of the embodiments. Also, the various means of releasably holding a portion of line may be used with the various embodiments as desired. Any of the various containers and shields described above may be solid, perforated, made from mesh, or made from screen as desired. Also, they may, as desired, be made from buoyant or nonbuoyant material or have added buoyant members.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element recited in any of the following claims is to be understood as referring to all equivalent elements or steps for accomplishing substantially the same results in substantially the same or equivalent manner. It is intended to confer the invention broadly in whatever form its principles may be utilized. The present invention is, therefore, well adapted to carry out the objects and obtain the ends and advantages mentioned, as well as others inherent therein.

What is claimed is:

1. A fish bait keeper comprising
   a container having a hollow top part releasably securable to a hollow bottom part,
   a main line connected to the hollow top part and extending to and connected to the hollow bottom part,
   a fish bait attached to the main line, and
   the fish bait and the main line releasably enclosable within the container when the hollow top part and the hollow bottom part are releasably secured together.

2. The fish bait keeper of claim 1 wherein the top part has a recess and the bottom part has a lip receivable in the recess so that the two parts are releasably snap-fittable together.

3. The fish bait keeper of claim 1 wherein the fish bait is attached to a secondary line which is connected to the main line and the secondary line and the fish bait are releasably enclosable within the container.

4. The fish bait keeper of claim 1 including a weight disposed in the hollow bottom part of the container.

5. The fish bait keeper of claim 1 wherein holes are provided in the container to facilitate the entry of water into the container.

6. The fish bait container of claim 1 wherein the hollow top part has a hole therein and a portion of the main line extends through the hole.

7. The fish bait container of claim 1 wherein the container is egg-shaped.

8. The fish bait container of claim 1 wherein the hollow parts are perforated.

9. A fish bait keeper comprising
   a container having a hollow top part releasably securable to a hollow bottom part,
   a main line connected to the hollow top part and extending to and connected to the hollow bottom part,
   a fish bait attached to a secondary line which is connected to the main line,
   the fish bait and the secondary line releasably enclosable within the container when the hollow top part and the hollow bottom part are releasably secured together,
   the top part having a recess and the bottom part having a lip receivable in the recess so that the two parts are releasably snap-fittable together.

10. A fish bait keeper comprising
    a main line,
    a first secondary line connected to the main line, a fish bait attached to the first secondary line,
    a top part of a fish bait container disposed about the first secondary line,
    a second secondary line connected to the main line below the first secondary line, a fish bait attached to the second secondary line,
    a bottom part of the fish bait container disposed about the second secondary line,
    the top part and the bottom part of the fish bait container releasably securable together to enclose the two secondary lines and their attached fish baits.

11. The fish bait keeper of claim 10 including a weight attached to the main line beneath a point of connection of the second secondary line to the main line.

12. The fish bait keeper of claim 10 wherein stop members are provided on each secondary line to maintain the top part and bottom part of the fish bait container apart from the fish baits upon release of the top part from the bottom part.

13. The fish bait keeper of claim 10 wherein the fish bait container is egg-shaped.

* * * * *